W. B. FORD.
SUSPENDING AND CONTROLLING HEADER.
APPLICATION FILED MAR. 30, 1917.
1,267,651.
Patented May 28, 1918.
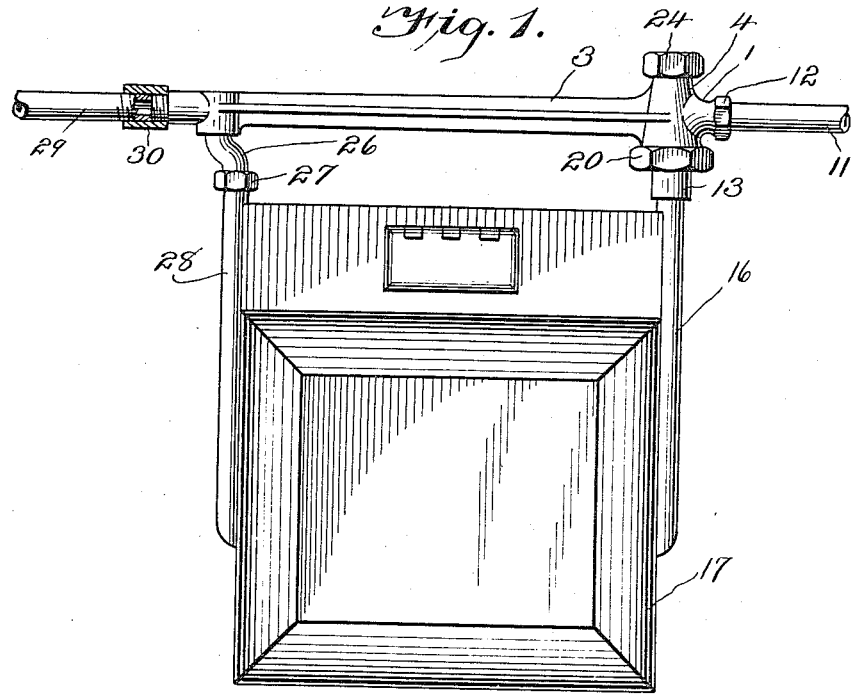
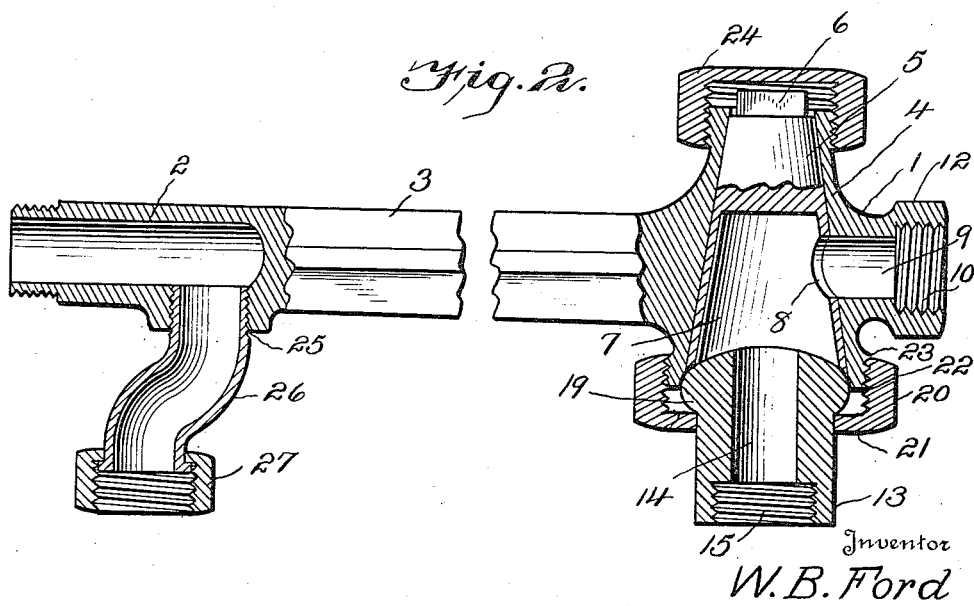
Inventor
W. B. Ford

UNITED STATES PATENT OFFICE.

WILLIAM B. FORD, OF BIRMINGHAM, ALABAMA.

SUSPENDING AND CONTROLLING HEADER.

1,267,651.

Specification of Letters Patent.   Patented May 28, 1918.

Application filed March 30, 1917. Serial No. 158,682.

*To all whom it may concern:*

Be it known that I, WILLIAM B. FORD, a citizen of the United States, and resident of the city of Birmingham, county of Jefferson, and State of Alabama, have invented certain new and useful Improvements in Suspending and Controlling Headers, of which the following is a specification.

This invention relates to gas meter connections, and one of the objects thereof is to provide a connection which may be attached to the supply pipe leading from the gas main to the meter so that the meter may be conveniently and efficiently secured to said supply pipe. As is well known, the ordinary gas supply pipe is constructed of iron and the meters are generally made of tinned sheet iron, with the inlets and outlets of brass which are soldered to the tinned sheet iron. In connecting the meters to the iron pipes the tube-screws are frequently ruined and the meters have to be returned for repairs. If, however, the connection is properly made, vibration causes the tube-screws to loosen especially if the installation is made in such a manner that the pipe connections are under strain. The difficulty above has heretofore somewhat been overcome by utilizing lead pipes for making connections, but this practice has lately been largely abandoned on account of expense and the kinking of the lead pipe.

It is one of the purposes of my invention to provide a permanent connection with the supply pipe so that the meter may be readily attached in a convenient manner without the employment of special tools and in such a way that liability of the parts becoming loose or strained may be reduced to a minimum, if not wholly avoided.

Other objects and advantages of this invention will be specifically referred to hereinafter, it being understood that changes in the form, proportion and minor details of construction may be resorted to without departing from the spirit of the invention or sacrificing any of its advantages.

In the drawings:—

Figure 1 is a front view of a meter connected to a supply line by a connection constructed in accordance with my invention; and Fig. 2 is an enlarged detail view of the connections partly in elevation and partly in section.

The connection is herein shown as comprising an inlet casing 1 and an outlet casing 2, the two being connected by an integral bar 3 whereby the inlet, the outlet and their connecting bar may be cast in a single piece if desired. The inlet casing 1 is provided with a central vertical opening 4 in the form of a truncated cone to receive a truncated conical turning-plug 5 having at one end a wrench receiving lug 6, and at the other end in the form of a shell 7 provided with an inlet opening 8 adapted to communicate with the port 9 of the casing 1, said port 9 being provided with internal threads 10 to engage similar threads on the end of the inlet pipe 11. The exterior of the port 9 is preferably polygonal, as shown at 12, whereby the connection may be screwed to said pipe 11. 13 designates a nipple comprising a tubular member having a central opening 14 to communicate with the interior of the shell 7 and provided with internal threads 15 to engage the inlet port 16 of the meter 17. The tubular member 13 is provided with an annular head 19 adapted to bear against the open end of the turning-plug 5 whereby a ball and socket joint is made. The turning-plug 5 may be held in close contact with the interior wall of the opening 4 by screwing up the connecting-collar 20, the flange 21 of which engages the under side of the head 19 and the threaded portion 22 of which engages the threaded portion 23 of the casing 1. In this manner, the turning-plug will always fit its casing. Under normal conditions, a cap 24 will be screwed on the casing 1 to protect the upper end of the plug 5.

The outlet casing 2 is provided with an inlet 25 which receives a curved or offset pipe connection 26 having a securing collar 27 at its lower end to engage the outlet-port 28 of the meter. The outlet casing 2 may be secured to the service pipe 29 which leads to the place of consumption by a connection 30.

From the foregoing, it will be seen that the connection constituting my invention may be of rigid form, easily secured to the supply pipe and service pipe in a permanent manner, so that the meters may be attached to and easily detached from said connection without the necessity of employing special skill or special forms of tools. The offset pipe 26 is employed to compensate for meters of varying widths, in actual practice, it being found that all meters are not of uniform width. When the connection is installed, the turning-plug 5 is turned so that the opening 8 does not register with the port 9 so that no gas may escape. When, however, it is desired to connect up the meter, it is only necessary to bring the inlet port 16 of the meter in line with the member 13, and the offset pipe 26 in line with the outlet port 28 of the meter, whereupon the meter may be readily connected up for service.

Devices such as serve the purpose of my invention are generally called headers in the art, so the device herein described will be referred to by such a term in the following claims.

I claim:

1. A combined suspending and controlling header for meters, comprising a spacing member carrying at its ends an inlet casing and an outlet casing adapted respectively to connect the inlet of the meter with the supply pipe and the outlet of the meter with the service pipe; the inlet casing being essentially a T connection, with a transverse bore in line with the supply and a through bore; a meter connecting member carried at one end of the through bore, a hollow tapered plug in the through bore having an open end presented to the meter connecting member, and a manipulating end presented through the other end of the through bore, and a coupling collar threaded upon the end of the inlet casing around the open end of the plug and adapted to draw the meter connecting member against said plug and seat the same.

2. A combined suspending and controlling header for meters, comprising a spacing member carrying at its ends an inlet casing and an outlet casing adapted respectively to connect the inlet of the meter with the supply pipe and the outlet of the meter with the service pipe; the inlet casing being essentially a T-connection, with a transverse bore in line with the supply and a through bore; a meter connecting member carried at one end of the through bore, a hollow tapered plug in the through bore having an open end presented to the meter connecting member, and a manipulating end presented through the other end of the through bore, and a cap fitted to the end of the inlet casing surrounding the protruding manipulating end of the plug and adapted to bar access to the latter.

The foregoing specification signed at Atlanta, Georgia, this 27 day of March, 1917.

WILLIAM B. FORD.